Figure 6:
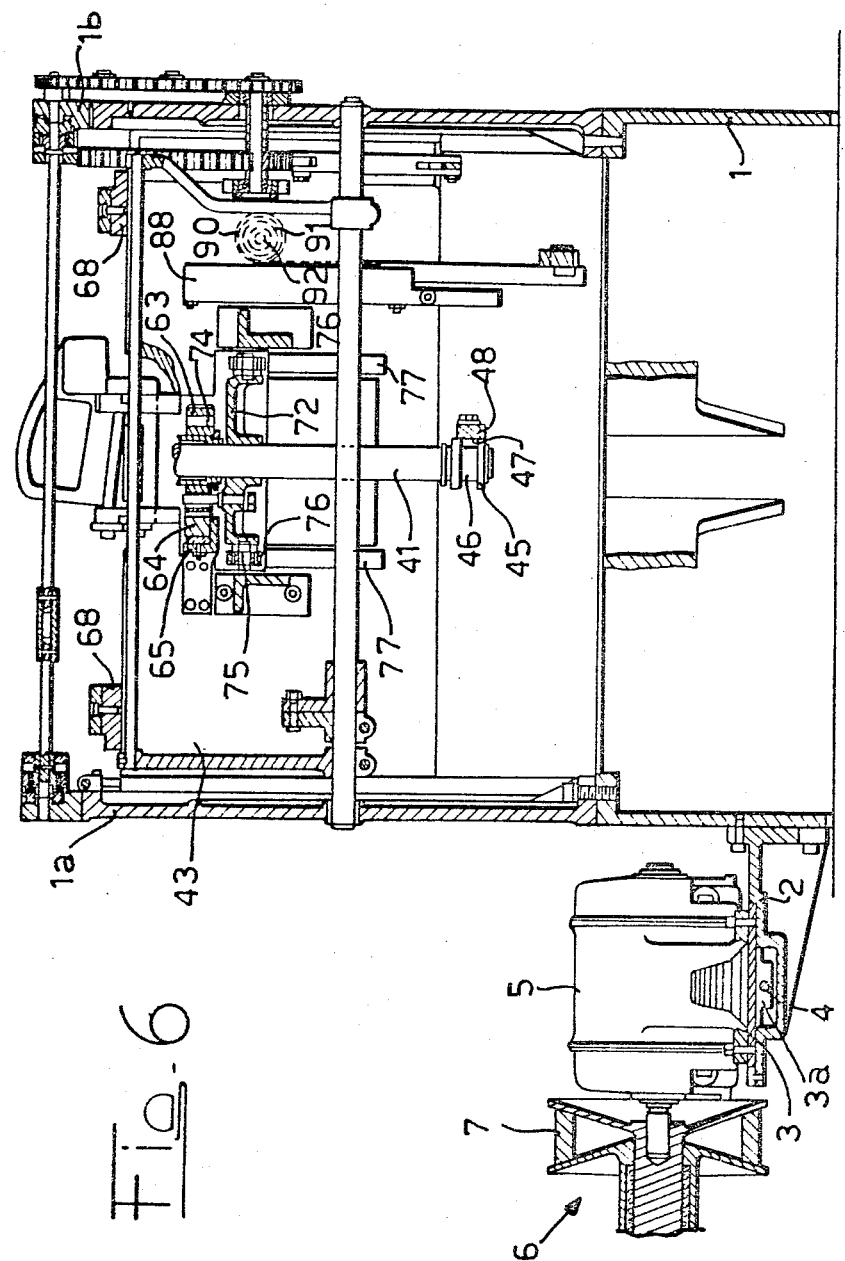

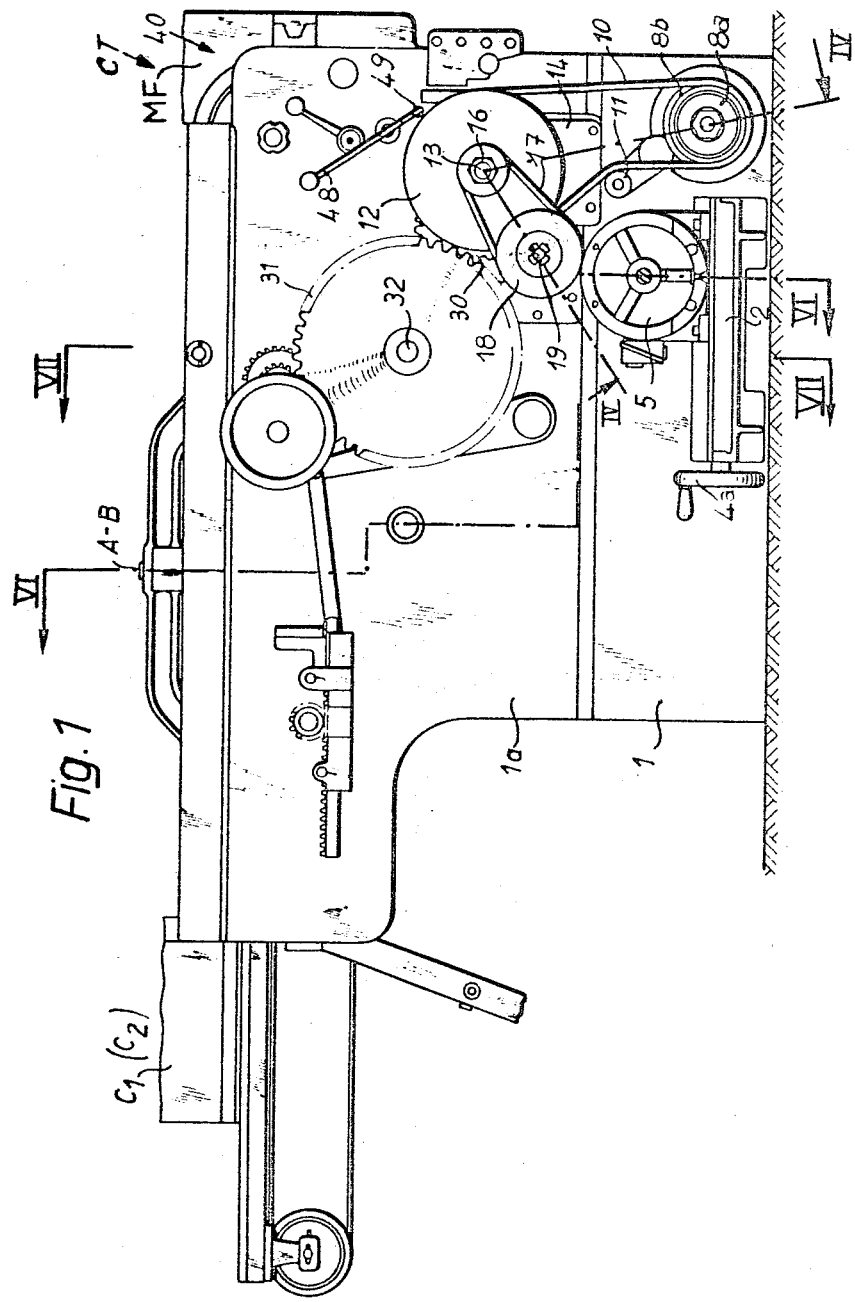

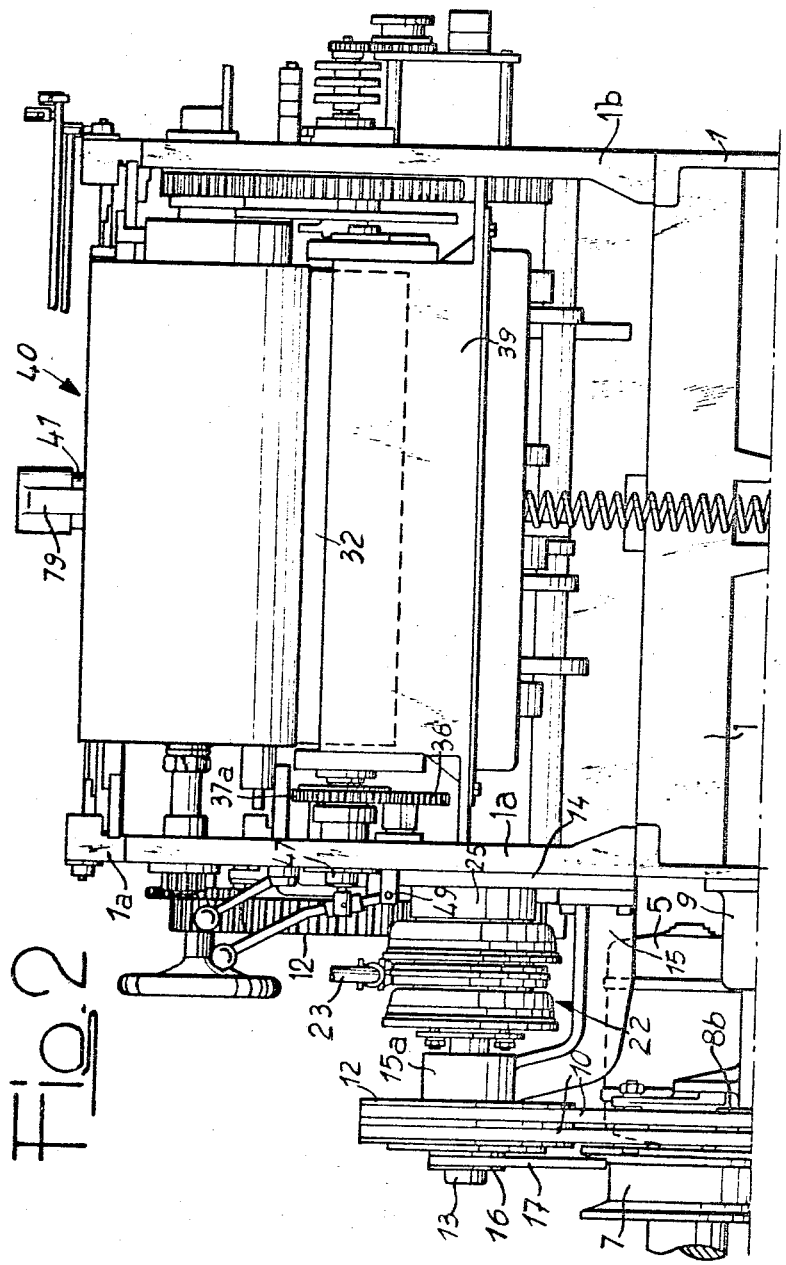

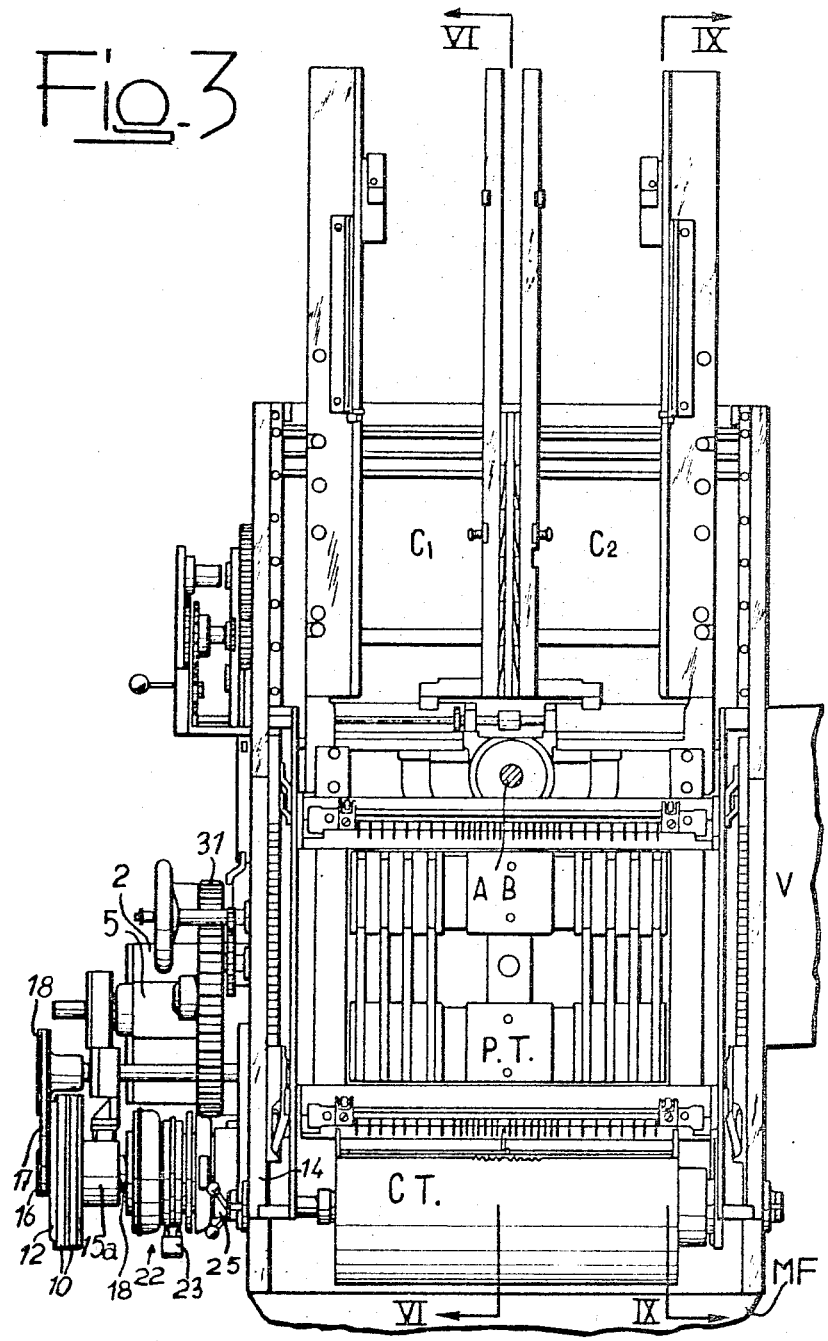

Aug. 8, 1967  L. DEPETRIS ETAL  3,334,758
BOOK COVER MANUFACTURING MACHINE
Filed Dec. 31, 1963  8 Sheets-Sheet 4
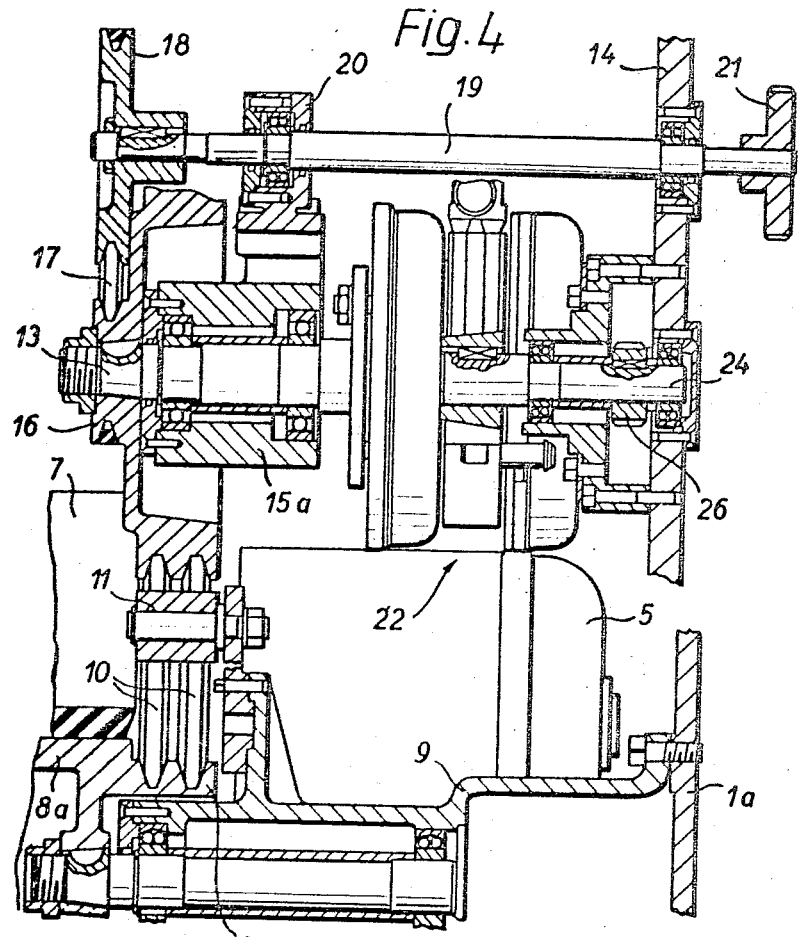
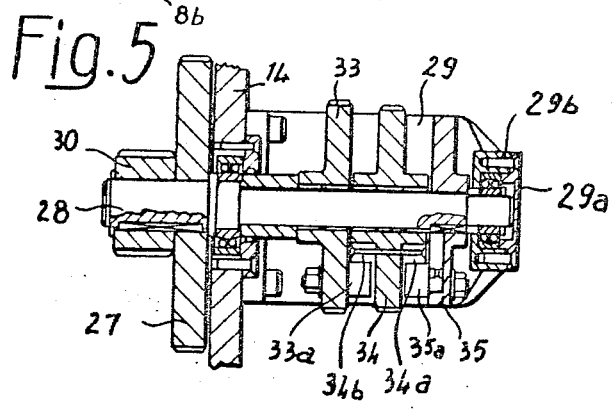

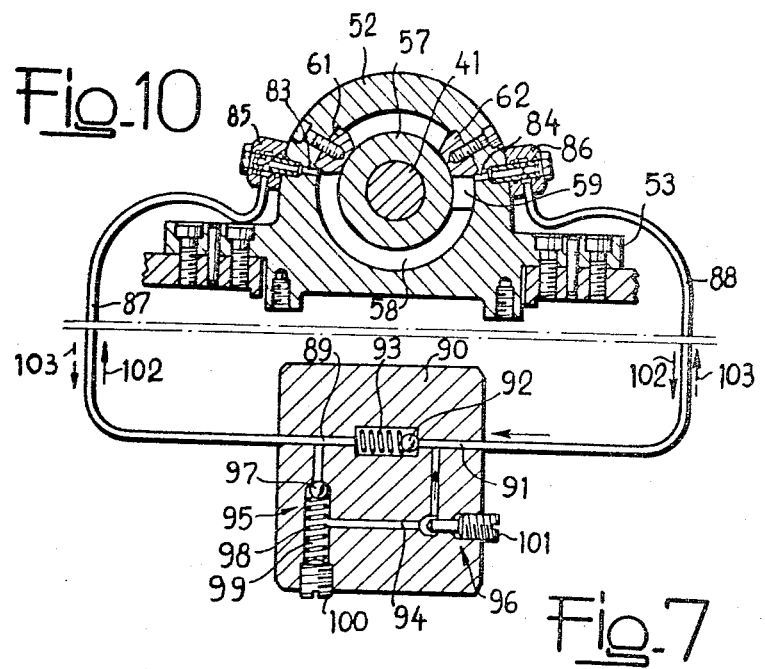
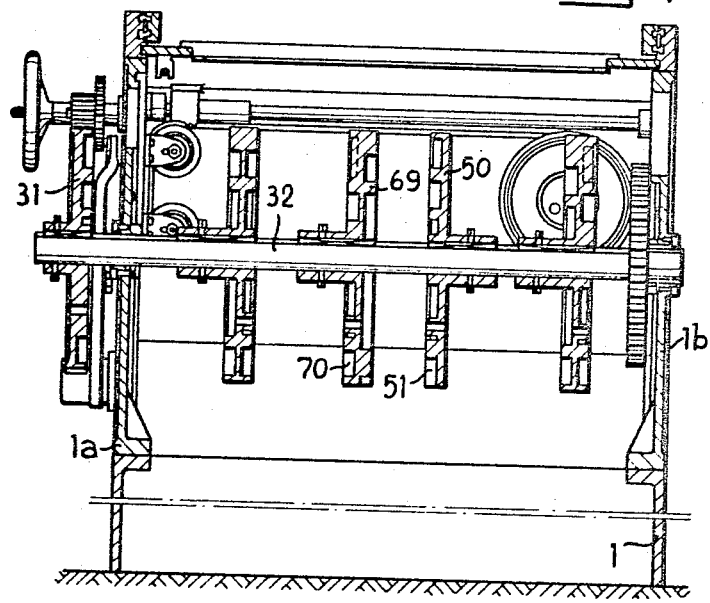

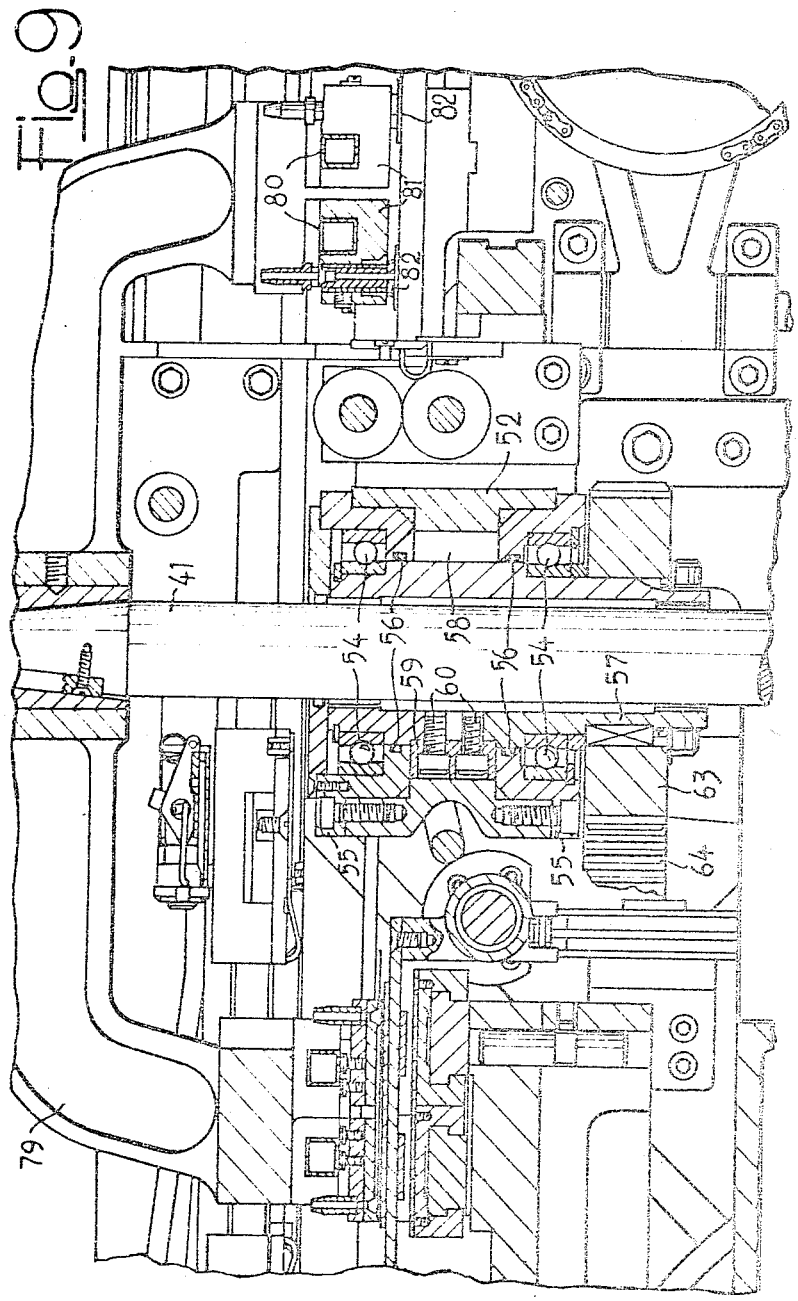

United States Patent Office 3,334,758
Patented Aug. 8, 1967

3,334,758
BOOK COVER MANUFACTURING MACHINE
Lorenzo Depetris and Giovanni Depetris, Milan, Italy, assignors to Smyth Europea S.p.A., Milan, Italy
Filed Dec. 31, 1963, Ser. No. 334,866
Claims priority, application Italy, May 10, 1963, 9,934/63
3 Claims. (Cl. 214—1)

This invention relates to a machine for manufacturing book covers.

Automatic or semi-automatic machines for manufacturing book covers are known, which comprise
a frame;
a device provided with a rotary cylinder or so-called cloth cylinder carrying along lining sheets and a coating roller cooperating with the cloth cylinder for applying adhesive to said sheets;
a platform adjustable in height, on which paperboard blanks and a back portion are superposed and secured to the lining sheet;
means cooperating with said platform, adapted to bend over the margins of said lining sheet;
means for receiving the lining sheets coated with adhesive from the cloth cylinder and transferring them to the platform;
a feed device for the paperboard blanks and back portions comprising two charging devices containing the paperboard blanks and a spool for the strip from which the back portions are cut;
a feed station for the paperboard blanks;
a mechanism for conveying the paperboard blanks from the charging devices and the tape on the spool to the squaring station;
a conveyor comprising at least one suction head carried by a vertical shaft adjustable in height, rotatable step by step for receiving the paperboard blanks and back portions from the squaring station and transferring them to the platform;
means for removing finished book covers from the platform and discharging them from the machine;
finally, operating means comprising a main drive or cam shaft, cams on said shaft, linkages and secondary drives adapted to operate in mutual synchronism the abovementioned mechanisms on the machine.

In known machines of this type the vertical shaft adjustable in height, associated with the conveyor carries a gear meshing, at least when said shaft is fully lifted, with a rack arranged in a plane perpendicular to the axis of said shaft and performing a reciprocating motion. In order to move the suction heads carried by an arm secured to the top of said vertical shaft from the feed station to the movable platform and/or vice versa, the gear on the vertical shaft intermittently rotates the latter, in one direction at least, when said shaft is fully lifted.

Moreover, in known machines of the type above referred to mechanical devices are provided, which are adapted to brake the vertical shaft carrying one or a plurality of arms each equipped with a suction head, during rotational movements performed by said shaft in order to transfer the paperboard blanks and their respective back portion from the feed station to the platform on which the paperboard blanks and back portion are glued to the cloth, and returning the empty suction head to the feed station. Braking of the rotation of the shaft carrying the arms and suction heads is required with a view to attenuating vibrations unavoidably undergone by the arms at the end of each rotational movement of the shaft. The tendency to vibrations increases with size of the book covers, manufacture of which necessitates the use of arms and suction heads proportioned to the size of the book covers.

The machine should therefore be provided with such a mechanical braking device, which shall be effective even when arms and suction heads commensurate in size (and weight) to the largest size of the book covers which can be manufactured on the machine are employed. Said mechanical devices are objectionable on account of their elaborate construction and unreliable operation and, additionally, of their bulk which gives rise to constructional problems, inasmuch as the brake should be located at the region on the machine at which several other mechanisms have to be arranged. Moreover, said brake should inherently be easily accessible for adjustment, maintenance and checking.

This invention provides a machine of the type referred to above, provided with a brake mechanism for the rotation of the shaft carrying the arm or arms provided with the suction heads, which avoids the abovementioned difficulties, is simple in construction and of low cost, reliable in operation, of small size and easily accessible for maintenance, adjustment and inspection.

A further object of this invention is to provide a machine of the type referred to above which is provided with improved means for controlling movement of the vertical shaft carrying the arm equipped with the suction heads.

According to this invention with the above objects in view a machine of the type referred to above is provided, which is equipped with a brake operated during rotation of the vertical shaft carrying the arm having attached thereto one suction head at least, said brake setting up a torque opposing said rotation.

The brake can be provided with means adapted to vary the torque opposing the rotation of the vertical shaft during the periods when the latter rotates.

Said means are preferably designed to increase the torque resisting rotation of the shaft carrying the arm to which one suction head at least is attached, towards the end of each period of rotation of said shaft.

The brake is preferably of a hydrodynamic type comprising a pump which is operated during rotation of the vertical shaft and an external hydraulic circuit connected with said pump, in which power absorbed by the brake is dissipated.

According to a preferred embodiment of this invention which can be used in connection with machines of the type referred to the pump is of the double acting rotary type comprising two elements provided with spaced co-axial cylindrical walls confining an annular space filled with liquid such as oil, one wall being provided with radial flanges defining the axial length of said annular space. One pump element is provided with radial lugs or vanes subdividing said annular space into two portions, the other element being provided with a radial lug subdividing one portion of the annular space into two chambers each connected by a conduit with the external hydraulic circuit. One element is stationary, the other element being connected with gear meshing with the reciprocating rack, so that during rotational reciprocation of the wheel liquid flows between said two chambers through the external circuit.

In machines the vertical shaft of which is constantly rotated in the same direction, the external circuit is such as to provide an increased resistance against liquid flow between the two chambers when rotation of one element of the pump is concordant with the rotation of the vertical shaft, and a reduced resistance when rotation of said pump element is contrary to rotation of the vertical shaft.

For this purpose the hydraulic circuit arranged externally of the pump, which can conveniently be located at any desired region on the machine, even the outline of the latter, comprises a conduit connected with the pump chamber, a first unidirectional valve in said conduit admitting flow between the two pump chambers only when the rotatable pump element rotates in a direction contrary to the vertical shaft, a by-pass conduit short circuiting said unidirectional valve, a second unidirectional valve acting oppositely said first unidirectional valve, an adjustable-bore throttle member being interposed in said by-pass conduit, whereby the latter was flowing therethrough a liquid which is opposed a predetermined resistance when said rotatable pump element rotates in a concordant direction with the arm-carrying vertical shaft on the machine.

According to a further characteristic feature of this invention, said gear meshing with the rack is securely fixed to a tubular sleeve encompassing the vertical shaft, forming the inner pump element, rotatable on bearings mounted in the cylindrical inner hollow in a stationary casing forming the other pump element, said gear being formed with two eccentric holes staggered through 180°, symmetrically arranged to the gear axis, said shaft carrying two eccentric pegs fitting into said holes in the gear when the shaft is in a fully lifted position and clear from said holes when the shaft is lowered, said gear then rotating oppositely to its rotation performed in the lifted condition of the shaft.

Figure 8:
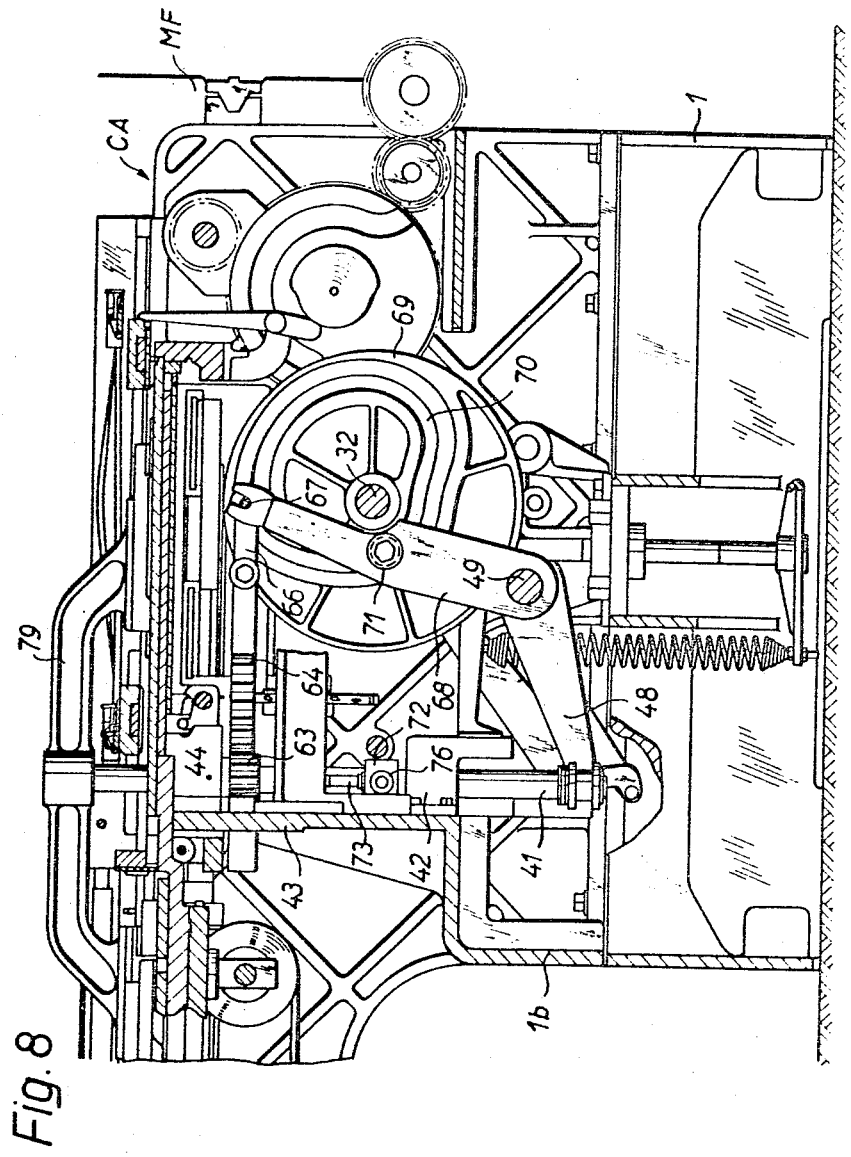

Further characteristic features and advantages of this invention will be clearly understood from the appended description referring by way of example to a construction shown on the accompanying drawings, wherein:

FIGURE 1 is a lateral elevational view of the machine according to this invention, FIGURE 2 is a front view, FIGURE 3 is a plan view, FIGURE 4 is a sectional view on line IV—IV of FIGURE 1 showing on an enlarged scale details of the drive for the machine components, FIGURE 5 is a longitudinal sectional view of a drive unit on an enlarged scale, FIGURES 6 and 7 are sectional views on lines VI—VI and VII—VII of FIGURE 1, FIGURE 8 is a sectional view on line VIII—VIII of FIGURE 3, FIGURE 9 is a sectional view on an enlarged scale of a constructional detail of the machine, FIGURE 10 is a sectional view on line X—X of FIGURE 9 with the added representation of a valve cooperating with one of the devices shown in FIGURE 9.

The general architecture of the machine will be clearly ascertained from the plan view in FIGURE 3, wherein $C_1$ and $C_2$ denote the two charging devices each containing a plurality of paperboard blanks adapted to form the faces of the book cover. Said paperboard blanks are arranged with their opposed edges placed on a back portion at the feed station PS and are carried by the charging devices $C_1$, $C_2$, ready for transfer to the platform PT adjustable in height, on which the paperboard blanks and back portion are glued to a lining sheet or cloth coated with adhesive. At CT a device is arranged for coating the cloth blanks with adhesive and delivering them to a bar BT conveying the cloth blanks to the platform PT. A shaft AB is provided with at least one arm, FIGURES 1 and 2, carrying a suction head which draws the paperboard blanks and back portion from the feed station PS and supports them till they are laid on the cloth blank which is ready to receive them on platform PT. A sheet feeder, diagrammatically denoted by MF, supplies the cloth blanks to the device CT, the finished covers being discharged by the device U.

The machine shown on the drawings comprises a bedplate 1 underlying the machine frame comprising two sidewalls 1a, 1b interconnected by bracing transverse walls.

One sidewall of the bedplate 1 (FIGURE 1) has secured to its bottom portion a bracket 2 formed with a longitudinal guideway for a slide 3. The slide 3 (FIGURE 6) is formed with a bottom extension 3a in which a tapped hole is bored engaging a screw 4 rotatable but non-axially displaceable on the bracket 2, carrying at one end a handwheel 4a, FIGURE 1, for rotation of the screw by hand.

An electric motor 5 driving the machine is secured to the slide 3. The motor shaft carries an expansible pulley 6, FIGURE 6, over which a V-belt 7 travels. The latter transmits motion to a cylindrical portion 8a, FIGURE 1, of a pulley rotatably mounted on a holder 9, FIGURE 4, secured to the machine bedplate 1 in proximity to the bracket 2, FIGURES 2 and 5.

A pair of V-belts 10 travel over the grooved portion 8b in the pulley and are subjected to the action of an idler 11 adjustable in position. The V-belts transmit motion to a pulley 12 on one end of a shaft 13, the other end of which extends towards a plate 14 which closes a through bore in the sidewall 1a of the machine frame, the shaft 13 being rotatably mounted on bearings located within a head 15a on an arm 15 secured to the plate 14. A peripheral groove of trapezoidal cross-sectional shape is cut in the hub 16 for the pulley 12. A V-belt 17 travels over the groove and transmits motion to a pulley 18 on a shaft 19 extending parallel with the shaft 13, mounted for rotation on bearings, one of which is located in a through bore in plate 14, the other bearing being located in a holder 20 secured to the head 15a on the arm 15. The end of the shaft 19 opposite from the end carrying the pulley 18 extends beyond the plate 14 and has mounted thereon a gear 21.

The shaft 13 transmits rotation to a unit 22 comprising a gradual friction clutch controlled by an electric contact 23. The output shaft 24 of the unit 22, FIGURE 5, is coaxial with the shaft 13 and is rotatably mounted in two bearings driven into the plate 14 and a holder 25, respectively, said holder 25 also being secured to said plate, said bearings being centrally bored for the shaft 24 to extend therethrough. The shaft 24 carries a gear 26 in the clearance between the plate 14 and the portion of the holder 25 extending parallel with said plate. The gear 26, FIGURE 5, meshes with a larger gear 27 on a shaft 28 extending parallel with the shaft 24 within the machine frame through an opening bored in plate 14. The shaft 28 is rotatably supported by a pair of bearings driven into said opening in plate 14 and in a through bore, respectively, closed by a cover plate 29a, formed in a leg 29b of a U-shaped holder 29 secured to the plate 14 in proximity to the bore in the latter through which the shaft 28 extends. The portion of shaft 28 reaching outside the gear 27 carries a gear 30 meshing, FIGURE 1 with a large gearing 31 on a shaft 32 carrying the cams (not shown) controlling in a manner known per se the various operations of the machine.

The portion of the shaft 28 between the plate 14 and leg 29a of the holder 29, FIGURE 5, carries a gear 33 loosely mounted thereon, meshing with the gear 21, FIGURE 4, on the shaft 19 receiving motion from the shaft 13 through belt 17 and pulley 18. A gear 34 is loosely mounted on shaft 28 near the gear 33, a disc 35 being arranged on shaft 28 on the side of the gear 34 facing the leg 29a of the holder 29.

The gear 34 meshes with an intermediate gear 36, FIGURE 2, rotatably carried by a holder 36a secured to the inner face of the sidewall 1a of the machine frame. The intermediate gear 36 meshes in turn with a toothed rim 37a secured to the adhesive coating roller 38, FIGURE 2.

A so-called cloth cylinder, generally denoted by 40 is arranged above the roller dipping into the adhesive in a receptacle 39.

A vertical shaft 41 is so arranged between the sidewalls 1a, 1b of the frame, FIGURES 1, 2, 3, 6, 8 and 9, that its axis is situated in the longitudinal middle plane of the machine as well as in a transverse plane offset from the cam shaft 32 in a direction opposite the end of the machine frame supporting the cloth cylinder 40 and coating roller 38.

The shaft 41 is mounted for rotation and axial movement in a vertical direction in a bottom holder 42, FIG. 8, secured to a transverse wall 43 interconnecting the sidewalls 1a, 1b of the frame, and in a top holder 44 which shall be described in detail hereafter, said top holder being secured like the holder 42 to the wall 43. The bottom end of the shaft 41 has rotatably mounted thereon a bushing 45, FIGURES 6 and 8, formed with an annular circumferential groove 46. The groove 46 engages a lug 47 rotatably mounted on the end of an arm 48, FIG. 8, of a bell crank lever fulcrumed to a cross shaft 49 carried in the opposite sidewalls of the frame. The other arm, not visible on the drawings, of said bell brank lever extends near a disc 50, FIGURE 7, on the cam shaft 32 formed with a continuous cam-shaped groove 51 in which a roller, not shown, rides, said roller being mounted at the end of said other arm of the bell crank lever. The cam-shaped groove 51 and the whole mechanism are so designed that the arm is movable between a bottom position, shown in FIG. 9, and a top position, shown in FIG. 6.

The top holder 44 comprises a block 52, FIG. 10, formed with a cylindrical through bore, the middle portion of which is smaller in diameter than the end portions.

The block 52 is provided with vertical side flanges 53, FIG. 10, screwed to the vertical margins of a middle bore, FIG. 6, in the top of the cross wall 43.

A sleeve 57 on shaft 41 is rotatably mounted within the block 52 through the interposition of antifriction bearings 54 and end cover plates 55 provided with seals 56, the sleeve 57 not being directly fixed to the shaft 41.

The periphery of the middle portion of the bore in the block 52 and the opposite radial faces of the cover plates 55, FIGS. 9 and 10, confine together with the outer periphery of the sleeve 57 an annular chamber 58. This chamber encloses a lug or vane 59 connected with sleeve 57 by screws 60, as well as two lugs 61, 62 screwed to the block 52. The bottom end of sleeve 57 depending from the block 52 carries a gear 63 meshing with a rack 64 displaceably mounted in an L-shaped guide 65 (FIGURE 6). The end of said rack facing the plane of the cam shaft 32 is articulated through a link 66 and a cross pivot 67 to a fork secured to the top of an arm 68 mounted for oscillation on the shaft 49. The arm 68 is arranged adjacent the disc 69, FIGURE 8, on the cam shaft 32 and disc 69 is formed with a continuous cam-shaped groove 70 cut in its face opposite the disc 50, FIG. 7, effecting vertical movement of the shaft 41. A roller 71 rides in the cam groove 70 and is rotatably mounted on a pivot extending from the arm 68 turned towards the disc 69. The cam-shaped groove 70 is so shaped as to reciprocate the rack 64 during each rotation of the cam shaft 32 in order to rotate the shaft 41 through 180° during forward movements directed oppositely the transverse plane in which the cam shaft 32 is situated.

A cross member 72, FIGURE 6, is keyed to the shaft 41 so as to be adjacent the gear 63 when the shaft 41 is fully lifted. The cross member 72 further carries a peg 73 fitting in the lifted condition of the shaft 41 in either through holes 74 staggered through 180° in the gear 63. The cross member 72 carries at each end a pivot 75 on which a roller 76 is rotatably mounted. The cross wall 43 having attached thereto the holders for the shaft 41 further carries two guideways 77, each acting as a rolling track for the rollers 76 during the initial upward movement and end downward movement of the shaft 41. The guide ways extend to the level of an edge 78 of the middle bore in the top of the wall 43. In the fully lifted condition of the shaft 41 with the peg 73 fitted into either hole 74 in the gear 63, the rollers 76 are above the top ends of the guideways 77, admitting free rotation of the shaft 41 together with the cross member 72. A double cross-arm 79 is mounted on the top of the shaft 41, FIGURES 1, 8 and 9, and has its ends downwardly bent ending in cross members 80. The latter carry in turn holders or picker heads 81 adjustable in position from which suction cups 82 depend and are connected through conduits not shown to a vacuum source.

As will be seen from the drawings, the suction cups supported at each end of the arm 79 form together a suction head diametrically opposite the suction head formed by suction cups supported at the other end of the arm 79. The length of the opposite portions of the double arm can be a variable one and is selected to suit the size of the book cover to be manufactured. FIGURE 9 shows an arm suitable for manufacturing small-size book covers, FIGURE 8 showing a double arm equipped with suction heads suitable for manufacturing large-size book covers.

The suction heads are adapted to draw the two paperboard blanks and back portion pre-arranged at the feed station PS, FIGURE 3, and transfer them to a diametrically opposite position and place them on the lining sheet or so-called cloth previously arranged on the movable platform PM (compare the location of the left-hand portion of the arm 79 in FIGURE 9).

In order to convey the paperboard blanks and back portion the shaft 41 should first be lifted from its lower position shown in FIGURE 9 to its upper position shown in FIGURE 6 and subsequently rotated through 180°. The sequence of these operations is afforded by the mutual phase arrangement of the discs in which the cam-shaped grooves 51 and 70, FIGURE 7, are formed. It is understood that during transfer of the paperboard blanks and back portion by one suction head, the other suction head first rises above the platform then rotates to a position above the squaring station for the paperboard blanks. On subsequent lowering of the shaft 41 together with the double arm 79, the latter suction head is again lowered on a fresh pair of paperboard blanks and back portion which have been fed to the squaring station, the other suction head placing the paperboard blanks and back portion thereon on a fresh lining sheet or cloth which has in the meantime been placed on the platform.

The annular chamber 58, in which the radial lug moves during rotation of the shaft 41, is filled with liquid, preferably oil, the space in the form of an annular segment confined by the lugs 61, 62 secured to the block 52, within which the lug 59 moves, being connected with the outside through holes 83 and 84 connecting through connecting pipes 85, 86 with pipes 87, 88, respectively. The pipe 88 opens into a conduit 91 bored in a block 90 secured to the cross wall 43 near the bottom holder for the shaft 41; however, said block 90 can, alternatively, be arranged externally of the machine. The pipe 87 opens into a conduit 89 likewise bored in the block 90, connecting with conduit 91 through a unidirectional valve comprising a ball 92 loaded by a spring 93, preventing liquid flow from conduit 89 to conduit 91, but not vice versa. The conduits 89 and 91 are provided with legs connecting with a conduit 94 through valves 95, 96, respectively, the valve 95 is of the unidirectional type and comprises a ball 97 loaded by a spring 98 accommodated by a bore 99 in the block 90 closed by a plug 100. The valve admits oil flow from the conduit 89 to conduit 94, but not vice versa. The valve 96 comprises a pin 101 screwed from the outside into a tapped bore in the block 90. The tip of the pin 101 intercepts connection between the conduits 91, 94, thereby providing a considerable adjustable range of resistance against oil flow between the conduits 89, 91. Obviously, during rotation of the gear in the direction of the arrow 102 oil flows from conduit 91 to conduit 89 through valve 92 and encounters a lower resistance than flow in a contrary direction which takes place when the shaft 41 rotates in the direction of the arrow 103. In the latter case oil is forced from the chamber 58 towards the conduit 89 through pipe 87 and, since it is not let through by valve 92 it flows to conduit 94 and through the adjustable valve 96 to conduit 91 connecting with pipe 88, its flow being opposed by a considerable resistance.

Obviously, the former case applies to the return stroke of the rack, during which the gear 63 is disconnected from the shaft 41 which does not rotate, while the latter case applies to the period of rotation of the suction cup-carrying arm, which is braked thereby advantageously damping otherwise unavoidable vibrations at the end of each rotation through 180°. The braking action of the device as described can be varied by adjusting valve 101 by hand, whereby the extent of the braking action can be suited to the size and weight of the suction cup carrying arm.

It will be understood that, the principle of the invention being left unaltered, the various constructional details of the embodiment of the machine can be widely varied with respect to the above description and illustration, without departing from the scope of the invention as defined by the appended claims.

For instance, the brake can be of a type other than hydrodynamic, such as of a mechanical type operated by cams on shafts rotating synchronously with the suction head carrying shaft, or of a type in which the friction elements are hydraulically controlled still by the action of cams as explained above.

Referring to the device described above with reference to FIGURE 10, the valve 96 can be in the form of a plunger movable in the block 90, affected by a chamber rotating synchronously with the movements of the shaft 41, designed to further throttle the liquid flow through conduit 94 towards the end of each rotation of the shaft 41.

What we claim is:
1. A machine of the type above referred to for manufacturing book covers, comprising: a frame having spaced apart stations for receiving constituent elements of said covers during respective stages in the manufacture of said covers; conveyor means for transferring said constituent elements from one of said stations to the other, said conveyor means comprising a picker head and a radially extending arm connecting said picker head to an intermittently rotatable shaft; said picker head extending over either of said stations and being rotatable by said shaft to a position over the other said station, said shaft being connected to a hydraulic braking means, said braking means restraining rotation of said shaft, and wherein said hydraulic braking means comprises a bored block secured to said frame, said shaft extending through a bore in said block, a sleeve rotatably mounted on said shaft and located within said bore, the outer and inner walls, respectively, of said sleeve and block forming therebetween an annular chamber, a vane fixed on the outer wall of said sleeve and being rotatable therewith, means fixed to said block and within said chamber dividing said chamber into non-interconnecting annular segmental portions, said vane being rotatable within one of said portions which comprises a pump chamber, radially extending bores in said block at opposite ends of said pump chamber, an external hydraulic circuit connected to said pump chamber through said bores, said sleeve extending axially outwardly of said bored block, a rotary gear rotatably mounted on said shaft and being fixedly connected to the circumference of said sleeve where said sleeve extends outwardly of said bored block, said gear and shaft comprising interengageable elements, rotation of said gear causing rotation of said sleeve and rotation of said shaft when said interchangeable elements are interchanged, rotation of said sleeve causing said vane to undergo a pumping action within said pump chamber whereby any fluid medium within said pump chamber would be pumped through said hydraulic circuit.

2. The machine as defined in claim 1, and wherein said hydraulic circuit comprises a valve block and conduits connecting said valve block with said radial bores in said bored block, said valve block comprising a first passage having a one-way valve controlling flow therethrough, each opposite end of said first passage being connected to a different one of said conduits, a second passage in said valve block bypassing said first passage, said second passage having a one-way valve and a throttle valve controlling flow therethrough.

3. The machine as defined in claim 2, and wherein said rotary gear undergoes oscillatory rotary motion, said motion being transmitted through said sleeve to said vane whereby said vane would pump any hydraulic medium, within said pump chamber and hydraulic circuit, in opposite directions through said circuit during respective oscillatory movements of said rotary gear, said valves in said valve block being so arranged as to permit flow through said first valve block passage during rotation of said rotary gear with said interengageable elements disengaged and flow only through said second passage during rotation of said rotary gear with said interengageable elements engaged.

References Cited

UNITED STATES PATENTS 2,920,989    1/1960    Cochran et al. _____ 156—556

EARL M. BERGERT, *Primary Examiner.*

M. L. KATZ, *Assistant Examiner.*